Figure 1:
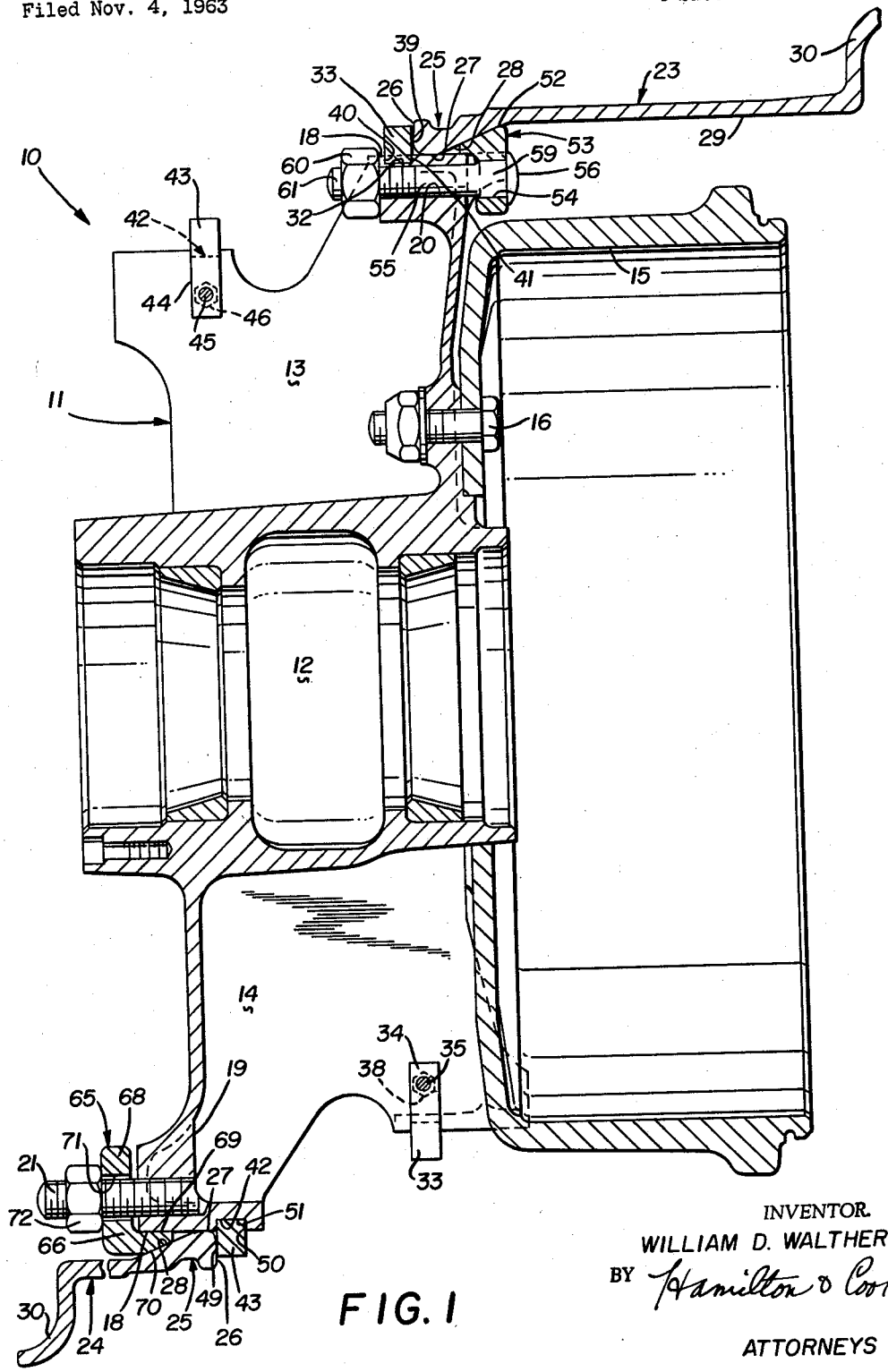

INVENTOR.
WILLIAM D. WALTHER

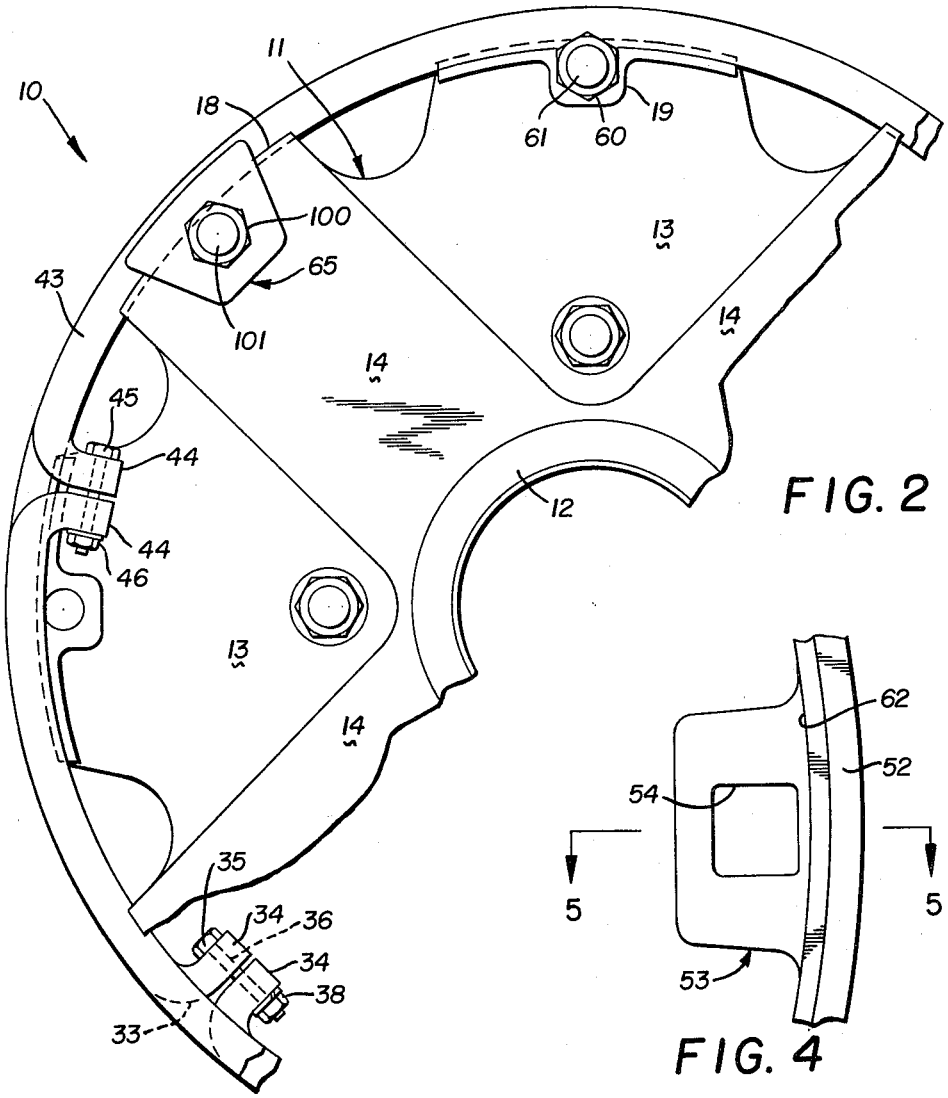
FIG. 2
FIG. 4
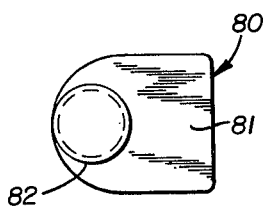
FIG. 6
FIG. 5
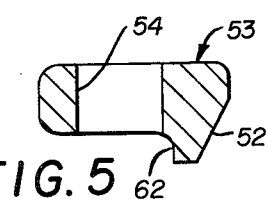
INVENTOR.
WILLIAM D. WALTHER
BY Hamilton & Cook
ATTORNEYS INVENTOR.
WILLIAM D. WALTHER
BY Hamilton & Cook
ATTORNEYS

United States Patent Office 3,194,605
Patented July 13, 1965

3,194,605
RIM AND WHEEL ASSEMBLIES
William D. Walther, Dayton, Ohio, assignor to The Dayton Steel Foundry Company, Dayton, Ohio, a corporation of Ohio
Filed Nov. 4, 1963, Ser. No. 321,033
4 Claims. (Cl. 301—13)

The present invention relates generaly to rim and wheel assemblies. More particularly, the present invention relates to the mounting of dual interchangeable rims on a wheel. Specifically, the present invention relates to improvements in rim and wheel constructions providing a more effective mounting of rims in dual fashion on a wheel to maintain accurate alignment of both rims with respect to the wheel and to maintain lateral runout control.

It is highly desirable to provide a mounting for dual rims which will ensure that both rims are in positive and exact alignment with a plane perpendicular to the axis of rotation of the wheel not only when the vehicle is at rest, but particularly when the vehicle is in motion and subject to dynamic forces and stresses.

If either, or both, of the rims are mounted on the wheel in such a manner as to lie in a plane which is not perpendicular to the rotational axis of the wheel, the tread of the tire will not contact the ground or roadway in a straight track with respect to the line of travel of the vehicle, but will meet the ground angularly, thus causing undue wear to the tire. Moreover, a canted inclination of the tire would cause it to wobble, inducing at certain speeds a harmonic vibration such as to dangerously affect operation of the vehicle.

Control of lateral runout, achieved by maintenance of the concentricity of the rim with respect to the rotational axis of the wheel, is also important to the safe operation of the vehicle. An eccentric rim mounting will induce harmonic vibrations at certain speeds. Eccentricity will also give rise to a shock loading with every revolution of the wheel, inducing excessive stresses on the rim and clamping devices.

Along with the maintenance of rim alignment and concentricity, it is also desirable that the dual rims be readily interchangeable for mounting in either the inner or outer position.

One difficulty in securing and maintaining accurate alignment and concentricity of conventional assemblies has been the problem of keeping the inner rim in alignment while the spacer, outer rim and clamping devices are successively placed in position. The weight of the rim and tire causes it to slide on the beveled mounting surface found at the axially inner side of the conventional wheel. Once the inner rim is positioned out of alignment and/or concentricity, it is difficult to restore the correct position.

Another cause of misalignment and failure to maintain concentricity is the uneven and irregular tightening to which the rim and clamping devices are generally subjected.

It is therefore an object of the present invention to provide a rim and wheel assembly in which rim alignment and concentricity is assured while the inner and outer rims are interchangeable.

It is a further object of the present invention to provide a rim and wheel assembly, in which each rim may be individually secured in proper alignment and concentricity.

It is a still further object of the present invention to provide a rim and wheel assembly for maintaining rim alignment and concentricity yet which is light in weight and low in cost.

These and other objects which will become apparent from the following specification are accomplished by means hereinafter described and claimed.

Two forms of a dual rim and wheel assembly according to the invention are shown by way of example in the accompanying drawings and hereinafter described in detail, without attempting to show all of the various forms and modifications in which the invention might be embodied; the invention being measured by the appended claims and not by the details of the specification.

Figure 3:
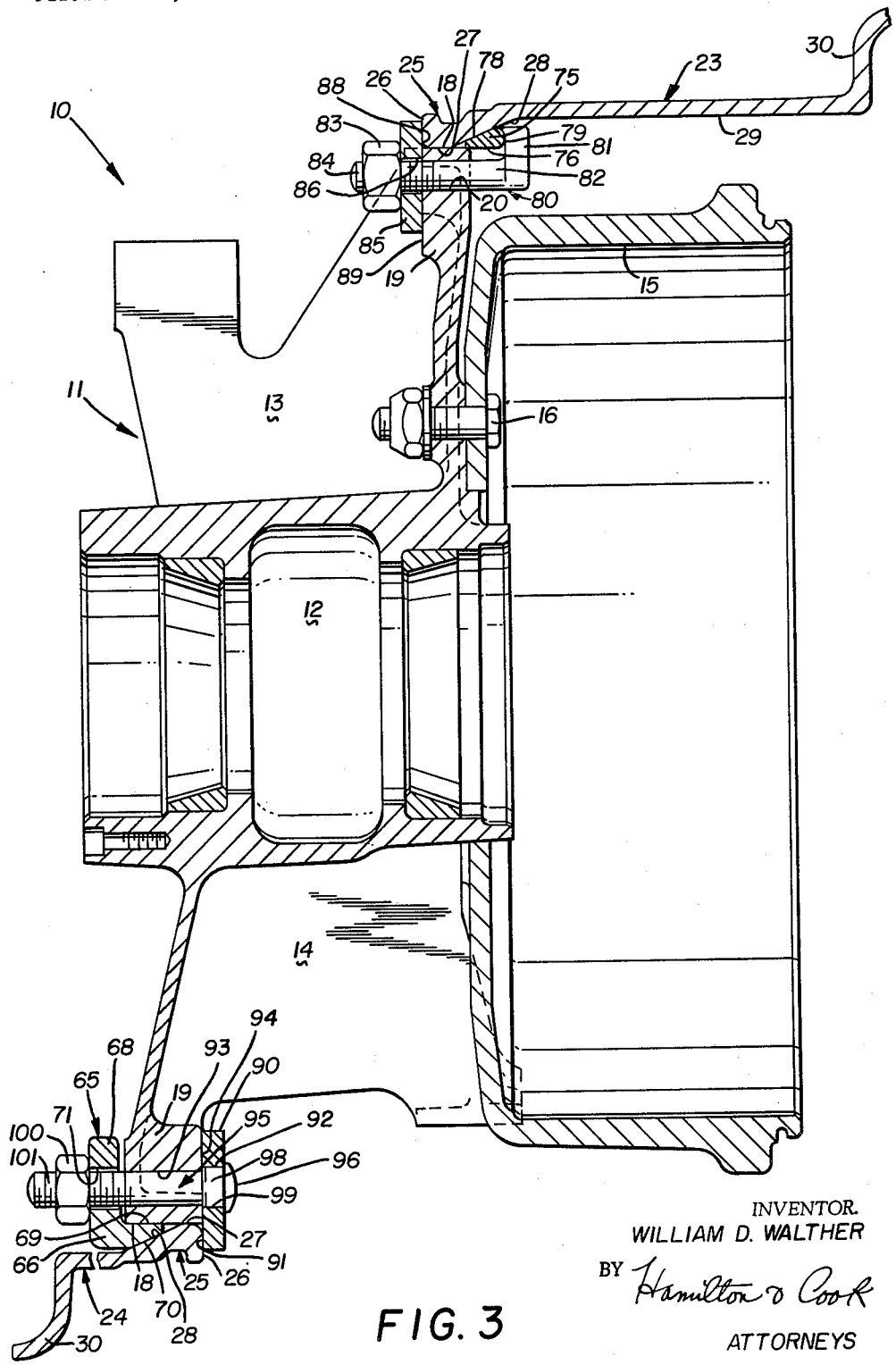
Figure 7:
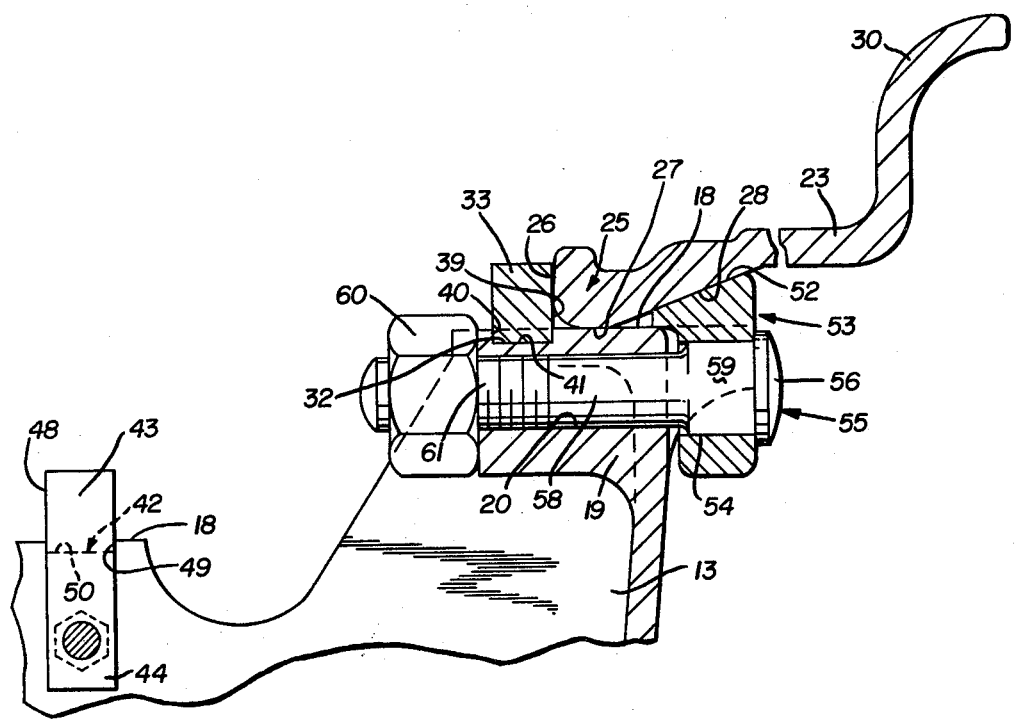
Figure 8:
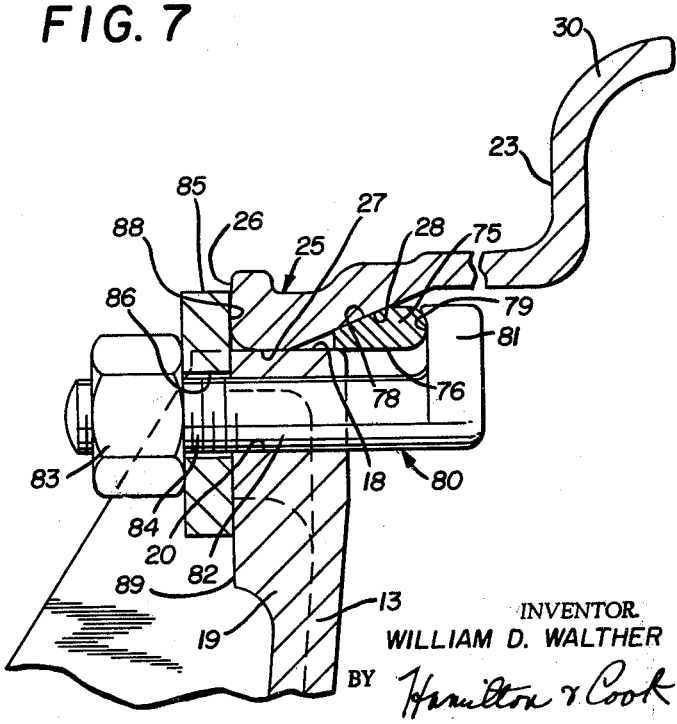

In the drawings:
FIG. 1 is a sectional view of a dual rim and wheel assembly according to the invention;
FIG. 2 is a fragmentary plan view of the assembly in FIG. 1;
FIG. 3 is a sectional view showing another form of a dual rim and wheel assembly according to the invention;
FIG. 4 is a fragmentary plan view of the clamp lugs shown in FIG. 1 for mounting the inner of the dual rims;
FIG. 5 is a section through a clamp lug taken substantially as indicated on line 5—5 of FIG. 4;
FIG. 6 is a full plan view of the clamp bolts shown in FIG. 3 for mounting the inner of the dual rims;
FIG. 7 is an enlarged fragmentary view of a portion of FIG. 1; and
FIG. 8 is an enlarged fragmentary view of a portion of FIG. 3.

A rim and wheel assembly according to the invention for mounting dual interchangeable inner and outer rims is indicated generally by the numeral 10. The wheel 11 has a plurality of inner and outer spoke members, each spoke member being positioned in an axially spaced-apart and staggered relation to an adjacent spoke member. The outer end of each spoke member has an axially flat or substantially horizontal felly surface and carries a removable and axially spaced positive stop or aligning element extending radially of the felly surface and a rim clamping device for seating, positioning and holding the mounting or gutter flange of a rim.

Referring to FIGS. 1 and 3, the wheel 11 has a conventional hub area 12. The radially extending spoke members are preferably integrally and continuously cast with the hub member in a generally radially corrugated configuration with the inwardly directed convolutions forming the inner spoke members 13 and the outwardly dierected convolutions forming the outer spoke members 14. As disclosed herein (see FIG. 2), a wheel 11 may have a set of four inner spoke members 13 staggered or alternatingly disposed in relation to a set of four outer spoke members 14. Such a "four-four spoke" construction is preferred, although "three-three," "five-five" or even "six-six" constructions could be used if desired, depending upon the diameters of the tires to be mounted.

The radially corrugated configuration of the wheel 11 not only provides the required axial separation from the ends of the spoke members 13 and 14 sufficient for working clearance between tires carried on the rims mounted thereon, but the axially inner convolutions provides radially extending circumferentially spaced surfaces for attachment of a brake drum 15, as by a series of bolts 16.

The outer end of each spoke member 13 and 14 terminates in an accurately machined, axially flat or substantially horizontal, load bearing or felly surface 18. A boss 19 adjacent the outer end of each inner spoke member 13 has an axially extending bore 20 therethrough to receive the supporting element for an inner spoke rim clamping device, as described in detail below. A similar boss 19 on each outer spoke member 14 carries an axially outwardly directed stud bolt 21 for supporting the outer spoke rim clamping device, also described in detail below.

As shown, the inner rim 23 and outer rim 24 are of the so called "flat-base" type construction. Such a rim construction has a mounting flange indicated at 25 with a radially oriented gutter or positioning surface 26, an axially oriented felly engaging or seating load bearing surface 27 and an axially inclined holding surface 28. The medial portion of a flat-base type rim is defined by an axially extending web 29 terminating in a fixed bead flange 30. Other types of rim construction, such as the so called "drop-center" type rim, could be used in the practice of the invention so long as such rim had the equivalent of mounting flange 25 and the positioning surface 26, seating surface 27 and mounting surface 28.

The form of assembly for mounting the dual interchangeable inner and outer rims, 23 and 24, as shown in FIGS. 1 and 7, has circumferentially continuous and removable positive stop and aligning elements clamped on the axially outer portion of the felly surface of each inner spoke member 23 and on the axially inner portion of the felly surface of each outer spoke member 24, and extending radially of the felly surfaces for positively positioning the rims. When the rims are seated on the felly surfaces, individual clamp elements carried by each spoke member to hold the rim mounting flanges in contact with the positioning elements.

Referring specifically to FIGS. 1 and 7, the axially outer portion of the felly surface of each inner spoke member 13 is provided with an accurately machined arcuate receiving notch 32 for a removable positive stop or aligning element in the form of an annular ring 33. The circumferentially continuous or "one-piece" aligning ring 33 is split transversely the circumference thereof and has a radially inwardly directed leg 34 on each of the opposed ends formed by the split. A keeper means, such as a bolt 35, joins the legs 34 through bores 36 and is provided with a nut 38 with which the legs 34 can be drawn together to decrease the diameter of the aligning ring 33 for secure location within the receiving notch 32.

When the ring 33 is clamped in notches 32, the axially inner face thereof provides an axially spaced positive stop aligning and positioning surface 39 extending radially of and substantially perpendicular to the rotational axis of the wheel 11, and from near or adjacent to the axially outer end of the felly surface 18 of the inner spoke member 13. An accurate and precise location of the removable ring 33 may be maintained when the ring is seated axially outwardly against a stop or register surface 40 on the axially outer side of each notch 32. It is also preferred that the radially inner surface 41 of each notch 32 be formed at a radial distance inwardly of the felly 18 such that the diameter of the ring 33 can never be made less than that required to project at least a portion of the positioning surface 39 radially outwardly of the felly surface 18.

Referring to FIG. 1, each outer spoke member 14 is provided with an accurately machined receiving arcuate notch 42 for a removable positive stop or aligning element in the form of an annular ring 43, similar to the inner spoke ring 33 in that ring 43 is also split transversely of its circumference and has radially inwardly directed legs 44 on the opposed ends of the ring which are joined by keeper bolt 45 and nut 46.

Whereas the inner spoke receiving notches 32 are located on the axially outer portion of the spoke members 13, the outer spoke receiving notches 42 are located near or adjacent to the axially inner end of the felly surfaces 18. When the ring 43 is clamped in notches 42 the axially outer face thereof provides an axially spaced positive stop aligning and positioning surface 49 extending radially of and substantially perpendicularly to the rotational axis of the wheel 11. An accurate and precise location of the removable ring 43 may be maintained when the ring is seated axially inwardly against a surface 50 on the axially inner side of each notch 42. It is also preferred that the radially inner surface 51 of each notch 42 be formed at a radial distance inwardly of the felly 18 such that the diameter of ring 43 cannot be decreased to an extent that the positioning surface 49 does not project radially outwardly of the felly surface 18.

As shown in both FIGS. 1 and 7, the inner rim 23 is mounted on the spoke members 13 with the flange surface 27 seated on and slidably engaging the axially flat felly surfaces 18, with the flange surface 26 in contact with the ring surface 39, and with the flange surface 28 matingly engaging a correspondingly inclined conical mounting surface 52 on the radially inner portion of each clamp lug 53. Referring also to FIGS. 4 and 5, the radially outer portion of each clamp lug 53 has a preferably square hole 54 therethrough to accommodate a supporting and clamping element indicated at 55, extending through the bore 20 in an inner spoke.

As best seen in FIG. 7, the axially inner end of a supporting element 55 has an enlarged head portion 56 for engaging a clamp lug 53. The shank portion 58 conforms with the bore 20. Between the shank 58 and head 56, there is a portion 59 conforming to the shape of the clamp lug hole 54 so that the support element 55 will not rotate during tightening of a nut 60 on a threaded portion 61 extending axially outward of the boss 19 on each spoke member 13.

As best seen in FIGS. 4 and 5, a clamp lug 53 has an enlarged circumferential dimension and an arcuate radially inner surface 62 intended to slide on the felly surfaces 18 during tightening of the support element 55 for each clamp lug. It is preferred that the circumferential dimension of a clamp lug 53 be substantially equal to the circumferential extent or span of each felly surface 18 so that the mounting surfaces 52 on each clamp lug will exert the maximum holding force against the surface 28 on an inner rim 23.

Referring to FIG. 1, to mount the inner rim 23, each support element 55 carrying a clamp lug 53 is inserted in a bore 20 and the inner rim is slipped over the outer spoke members 14 and located on the inner spoke members 13 axially inwardly against the clamp lugs. Then, the inner aligning ring 33 is slipped over the outer spoke members and located in the notches 32. Next, the keeper means 35 is tightened to decrease the diameter of the ring sufficiently that the ring cannot lift out of the notches 32 and slide out on the felly surfaces 18. Then, each nut 60 is tightened to move the clamp lugs 53, with the arcuate surface 62 in sliding engagement with each felly surface 18, axially outwardly into holding engagement with the rim 23. When the support means 55 have been fully tightened, the slight axially outward movement of the rim 23 will urge the aligning ring 33 axially outwardly until engagement of the surface 39 against the register surface 40 of each notch 32, assuring that the rim flange surfaces 26, 27 and 28 will be fully and correctly seated.

The interchangeable outer rim 24 is similarly mounted. First, the outer aligning ring 43 is slipped over the felly 18 on outer spoke members 14 and inserted into notches 42. The nut 46 on the keeper bolt 45 is then tightened to retain the outer ring 43. The outer rim 24 is then positioned with the seating surface 27 engaging the felly surfaces 18 of the outer spoke members 14 and the positioning surface 26 contacting the radially oriented aligning surface 49 on the ring 43.

Outer clamp lugs indicated at 65 are then mounted on the stud bolts 21. Each outer clamp lug 65 has an axially oriented or lateral leg 66 and a radially oriented or upright leg 68. The lateral leg 66 has an arcuate surface 69 on the radially inner side thereof for slidably engaging the felly surfaces 18 and a conical or axially inclined mounting surface 70 on the radially outer side thereof for matingly engaging the axially inclined mounting surface 28 on the outer rim 24. An axial bore 71 through the radial leg 68 of each clamp lug 65 receives the stud bolt 21, having a threaded portion for mounting a nut 72 which is tightened to move the clamp lug axially inwardly into holding engagement with the outer rim 24.

When the nuts 72 have each been fully tightened, the slight axially inward movement of the rim 24 will urge the aligning ring 43 axially inwardly until engagement against the register surface 50 of each notch 42, assuring that the rim mounting flange surfaces 26, 27 and 28 will be fully and correctly seated.

The form of assembly for mounting the dual interchangeable inner and outer rims, 23 and 24, as shown in FIGS. 3 and 8, has a series of individual and removable positive stop and aligning elements attached at the axially outer end of the felly surface of each inner spoke member 23 and at the axially inner end of the felly surface of each outer spoke member 24 and extending radially of the felly surfaces for positively positioning the rims. When the rims are seated on the felly surfaces, a circumferentially continuous clamp element carried by each inner spoke member holds the inner rim in contact with an inner spoke positioning element and individual clamp elements carried by each outer spoke member hold the outer rim in contact with an outer spoke positioning element.

Referring specifically to FIGS. 3 and 8, a circumferentially continuous or "one-piece" wedge ring 75 contacts and holds the mounting flange of an inner rim 23. The wedge ring 75 has an arcuate radially inner surface 76 intended to slide on the felly surfaces 18 and an inclined conical mounting surface 78 intended to matingly engage with the rim flange surface 28. The axially inner or thickened edge of ring 75 has a surface 79, preferably rounded, but of any suitable shape to be positively contacted and engaged by a supporting and wedge ring clamping element indicated at 80, extending through the bore 20 in an inner spoke end.

As best seen in FIGS. 6 and 8, the clamping means or element 80 has an enlarged head portion 81 engaging the surface 79 of the wedge ring 75. The shank portion 82 conforms with the bore 20. A nut 83 on a threaded portion 84 extending axially outward of the boss 19 on a spoke member 13 provides for tightening of the wedge ring and clamp elements.

Referring still to FIG. 8, each of the positive stop or aligning elements for the inner spoke members 13 is in the form of a plate 85. A plate 85 has a hole 86 therethrough to accommodate the supporting element 80. The axially inner face of a plate 85 provides an axially spaced positive stop aligning and positioning surface 88 extending radially of and substantially perpendicular to the rotational axis of the wheel 11, and from at or on the axially outer end of the felly surface 18 of each inner spoke member 13.

As shown in both FIGS. 3 and 8, the inner rim 23 is mounted on the spoke members 13 with the flange surface 27 seated on and slidably engaging the axially flat felly surfaces 18, with the flange surface 26 in contact with the plate surfaces 88, and with the flange surface 28 matingly engaging the wedge ring surface 78. The axially outer face 89 of each inner spoke boss 19 is preferably accurately machined to provide a stop or register surface for a plate 85 when the support element 80 is tightened for mounting of an inner rim.

Whereas the inner spoke positive stop or aligning elements 85 are located at the axially outer end of the felly surfaces 18 of the inner spoke members 13, the outer spoke positive stop or aligning elements 90 are located at the axially inner end of the felly surfaces 18. Referring to FIG. 3, each outer spoke member 14 is provided with a removable positive stop or aligning element in the form of a plate 90 having an axially outer face which provides an axially spaced positive stop aligning and positioning surface 91 extending radially of and substantially perpendicular to the rotational axis of the wheel 11, and from at or on the axially inner end of the felly surface 18 of each outer spoke member 14. The plate 90 preferably has a square hole 92 therethrough to accommodate a supporting and clamping element indicated at 95, extending through a bore 93 in the outer end of each spoke member 14. The axially inner face 94 of each outer spoke boss 19 is preferably accurately machined to provide a stop or register surface for a plate 90 when the support element 95 is tightened for mounting of an outer rim.

The axially inner end of the supporting element 95 has an enlarged head portion 96 for engaging an aligning plate 90. The shank portion 98 conforms with the bore 92. Between the shank 98 and head 96, there is a portion 99 conforming to the shape of the plate hole 91 so that the support element will not rotate during tightening of a nut 100 on a threaded portion 101 extending axially outward of the boss 19 on each spoke member 14.

The outer clamp lugs mounted on the support element 95 may be the same as the lugs 65, described above, having a lateral leg 66 and an upright leg 68. The lateral leg has an arcuate surface 69 slidably engaging the felly 18 and a conical surface for matingly engaging the mounting surface 28 on the outer rim 24. The upright leg has an axial bore 71 which receives the support element 95.

Referring to FIG. 3, to mount the inner rim 23, each support element 80 is inserted in a bore 20 and the wedge ring 75 is slipped over the outer spoke members 14 and located on the inner spoke members 13 axially inwardly against the heads 81 of the support elements. Then, the inner rim is slipped over the outer spoke members and located on the inner spoke members. Next the aligning plates 85 are put on the support elements and each nut 83 is applied and tightened to move the wedge ring, with the arcuate surface 76 in sliding engagement with each felly surface 18, axially outwardly into holding engagement with the rim 23. When the support means 80 have been fully tightened, relative axial movement of the wedge ring 75 and positioning plates 85 will assure that the rim flange surfaces will be fully and correctly seated.

The interchangeable outer rim 24 is similarly mounted. First, each support element 95 carrying an aligning plate 90 is inserted in a bore 92. Then, the outer rim 24 is located on the outer spoke members 24. Next, the outer clamp lugs 65 are put on the support elements and each nut 100 is applied and tightened to move the clamp lug axially inwardly into mounting engagement with the outer rim 24. When the support means 95 have been fully tightened, relative movement of the clamp lugs 65 and positioning plates 90 will assure that the rim flange surfaces will be fully and correctly seated.

While the form of a dual rim and wheel assembly shown in FIG. 1 use individual clamp lugs 53 on each inner spoke member 13, the circumferentially continuous wedge ring 75 and clamping elements 80 could also be utilized if desired. Likewise the wedge ring 75 as shown in FIG. 3 could be replaced by the individual clamp lugs 53 and support elements 55, if desired.

What is claimed is:

1. In a rim and wheel assembly, dual interchangeable inner and outer rims having a mounting flange, a wheel having a plurality of inner and outer spoke members, each spoke member having an axially spaced-apart and staggered relation to an adjacent spoke member and an axially flat felly surface, a first series of individual aligning means attached at the axially outer end of the felly surface of each of said inner spoke members, each of said first series of aligning means having an axially inner face providing a surface extending radially of and substantially perpendicular to the rotational axis of the wheel for positioning the mounting flange of an inner rim, a second series of aligning means attached at the axially inner end of the felly surface of each of said outer spoke members, each of said second series of aligning means having an axially outer face providing a surface extending radially of and substantially perpendicular to the rotational axis of the wheel for positioning the mounting flange of an outer rim, clamp devices on said inner spoke members for holding the mounting flange of an inner rim seated on the felly surfaces axially outwardly in engagement with the positioning surfaces of said first series of aligning means, and additional clamp devices on said outer spoke members for holding the mounting flange of an outer rim seated on the felly surfaces axially inwardly in engagement with the positioning surfaces of said second series of aligning means.

2. A rim and wheel assembly for mounting dual interchangeable inner and outer rims on a wheel having a plurality of inner and outer spoke members, each spoke member having an axially spaced apart and staggered relation to an adjacent spoke member to define alternate inner and outer spoke members, the radially outer end of each spoke member having an axially flat felly surface and a stop surface extending radially inwardly of said felly surface, a removable aligning means supported by said inner spoke members and a separate removable aligning means supported by said outer spoke members, said aligning means each having a radially oriented stop surface, the stop surface on the aligning means carried on said inner spoke members facing axially inwardly to engage the stop surface on said inner spoke members and extending radially outwardly of the felly surface on said inner spoke members, the stop surface on the aligning means carried on said outer spoke members facing axially outwardly to engage the stop surface on said outer spoke members and extending radially outwardly of the felly surface on said outer spoke members, each rim having a mounting flange with a radially oriented positioning surface, an axially oriented seating surface and an axially inclined holding surface, the positioning surface on each rim engaging the stop surface on the aligning means supported by the respective spoke members on which said rim is carried, the seating surface on each rim engaging the felly surface on the respective spoke members on which said rim is carried, a clamping device demountably attached to each spoke member, said clamping device having an axially inclined conical surface, said conical surface engaging the holding surface on the rim carried on the respective spoke member on which said holding device is attached.

3. A rim and wheel assembly for mounting dual interchangeable inner and outer rims having a mounting flange on a wheel having a plurality of inner and outer spoke members, each spoke member having an axially spaced apart and staggered relation to an adjacent spoke member, the outer end of each spoke member having an axially flat felly surface terminating in a radially inwardly directed stop surface, the radially oriented stop surface on said inner spoke members positioned on the axially outer side thereof and the radially oriented stop surface on said outer spoke members positioned on the axially inner side thereof, individual and removable positive stop and aligning elements attached to said spoke members, each aligning element having a stop surface contacting the stop surface on its respective spoke member and extending radially outwardly of the felly surface thereon, clamp elements, each said rim having a mounting flange, one surface on each said mounting flange laterally engaging the radial stop surface on said aligning element, a second surface on each said mounting flange radially engaging said felly surface and a third surface on each said mounting flange engaged by said clamp elements lockingly to maintain the first two of said surfaces on the mounting flange in engagement with the corresponding surfaces on the aligning elements and spoke members on which said rim is carried.

4. A rim and wheel assembly for mounting dual interchangeable inner and outer rims on a wheel having a plurality of inner and outer spoke members, each spoke member having a felly surface with an axially spaced apart relation to the felly surface of an adjacent spoke member and terminating in a radially oriented stop surface, the radially oriented stop surface on said inner spoke members positioned on the axially outer side thereof and the radially oriented stop surface on said outer spoke members positioned on the axially inner side thereof, each rim having a mounting flange with a radially oriented positioning surface, an axially oriented seating surface, and an axially inclined holding surface, the felly surface on each spoke member being axially flat for seating a mounting flange, there further being individual and removable elements attached at the axially outer end of the felly surface of each inner spoke member and at the axially inner end of the felly surface of each outer spoke member, each element having a radially extending surface for positively engaging the positioning surface on a rim mounting flange and said rim stop surface, a circumferentally continuous clamp element carried on each inner spoke felly surface for holding the mounting flange of an inner rim, and an individual clamping element carried by each outer spoke member for holding the mounting flange of an outer rim.

References Cited by the Examiner

UNITED STATES PATENTS

| | | | |
|---|---|---|---|
| 1,945,277 | 1/34 | Kay | 301—13 |
| 1,975,273 | 10/34 | Higbee | 301—13 X |
| 2,259,813 | 10/41 | Garnett et al. | 301—13 X |
| 2,767,026 | 10/56 | Walther | 301—13 |

FOREIGN PATENTS

| | | |
|---|---|---|
| 746,680 | 3/56 | Great Britain. |
| 785,970 | 5/35 | France. |

ARTHUR L. LA POINT, *Primary Examiner.*